United States Patent
Krohn et al.

(10) Patent No.: US 10,244,676 B2
(45) Date of Patent: Apr. 2, 2019

(54) SELF-PROPELLED AGRICULTURAL PRODUCT APPLICATION IMPLEMENT

(71) Applicant: CNH Industrial America LLC, New Holland, PA (US)

(72) Inventors: Martin L. Krohn, DeGraff, MN (US); Kevin T. Bernier, Spicer, MN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/652,825

(22) Filed: Jul. 18, 2017

(65) Prior Publication Data
US 2017/0311539 A1    Nov. 2, 2017

Related U.S. Application Data

(62) Division of application No. 14/100,535, filed on Dec. 9, 2013, now Pat. No. 9,743,579.

(51) Int. Cl.
   *A01C 23/00*    (2006.01)
   *A01B 79/00*    (2006.01)
   *A01M 7/00*     (2006.01)

(52) U.S. Cl.
   CPC .......... *A01C 23/008* (2013.01); *A01B 79/005* (2013.01); *A01M 7/0085* (2013.01)

(58) Field of Classification Search
   CPC ..... A01C 23/008; A01C 23/007; A01C 23/02; A01C 23/006; A01B 79/005; A01M 7/0085

(Continued)

(56) References Cited

U.S. PATENT DOCUMENTS

| 4,313,566 A | * | 2/1982 | Klein | ............... A01G 25/09 137/255 |
| 4,644,871 A |   | 2/1987 | Arrey et al. | |

(Continued)

FOREIGN PATENT DOCUMENTS

| EP | 0159762 | 10/1985 | |
| EP | 202037 | * 11/1986 | ............. A01C 23/00 |

(Continued)

OTHER PUBLICATIONS

"Open Roads Forum", http://www.rv.net/forum/index.cfm/fuseaction/thread/tid/23451531/print/tru . . . Jun. 25, 2013.

*Primary Examiner* — Alexander Valvis
*Assistant Examiner* — Christopher R Dandridge
(74) *Attorney, Agent, or Firm* — Rebecca L. Henkel; Rickard K. DeMille

(57) ABSTRACT

A self-propelled agricultural product application implement such as high clearance sprayer and/or spreader is provided that includes a product container that is sectioned. Emptying of the container sections is controlled to approximate a target front-to-back weight distribution of the implement for a substantially long period of time during a product application session. An outlet system having multiple variable outlet arrangements is arranged between the product container and an application arrangement such as a spray boom or a rotary broadcaster. The variable outlet arrangements are configured to allow the container sections to sequentially empty to maintain ballast provided by the store product at relatively later portions of the implement for a relatively longer period of time during the product application session.

4 Claims, 5 Drawing Sheets

(58) Field of Classification Search
USPC .................................. 239/159–170, 71, 74
See application file for complete search history.

(56) References Cited

U.S. PATENT DOCUMENTS

| | | | |
|---|---|---|---|
| 5,096,336 A | | 3/1992 | Merrett et al. |
| 5,098,018 A | * | 3/1992 | Hadar .................. A01M 7/0014 180/89.13 |
| 5,186,936 A | | 2/1993 | Groves |
| 5,485,956 A | | 1/1996 | Lenhardt |
| 5,665,910 A | | 9/1997 | Knutson et al. |
| 5,742,914 A | | 4/1998 | Hagenbuch |
| 6,233,911 B1 | | 5/2001 | Dillon |
| 6,584,920 B1 | | 7/2003 | Cresswell |
| 6,938,829 B2 | | 9/2005 | Doherty et al. |
| 7,775,168 B2 | | 8/2010 | Sidhwa et al. |
| 8,695,396 B2 | * | 4/2014 | Landphair ............... A01C 7/081 73/1.16 |
| 9,332,687 B2 | * | 5/2016 | Keigley ................ A01B 63/008 |
| 2007/0245936 A1 | * | 10/2007 | Sidhwa ................ A01C 23/008 111/118 |
| 2008/0191055 A1 | * | 8/2008 | Ellsworth ........... A01M 7/0053 239/166 |
| 2008/0226434 A1 | | 9/2008 | Smith et al. |
| 2010/0023222 A1 | | 1/2010 | Chiocco |
| 2010/0320727 A1 | | 12/2010 | Haul et al. |
| 2012/0036914 A1 | | 2/2012 | Landphair et al. |
| 2012/0316673 A1 | | 12/2012 | Riffel et al. |
| 2015/0334916 A1 | * | 11/2015 | Bernier ................ A01C 23/008 239/71 |

FOREIGN PATENT DOCUMENTS

| | | | |
|---|---|---|---|
| EP | 0202037 | 11/1986 | |
| EP | 0136910 | 7/1987 | |
| EP | 0506210 | 10/1992 | |
| GB | 2174449 | * 4/1985 | ............. B65D 88/02 |

\* cited by examiner

US 10,244,676 B2

SELF-PROPELLED AGRICULTURAL PRODUCT APPLICATION IMPLEMENT

CROSS-REFERENCE TO RELATED APPLICATION

This application is a divisional of U.S. Ser. No. 14/100,535, filed Dec. 9, 2013.

FIELD OF THE INVENTION

The invention relates generally to agricultural product application equipment such as liquid sprayers and dry product spreaders and, in particular, to self-propelled high clearance sprayers and spreaders.

BACKGROUND OF THE INVENTION

Modern farming practices strive to minimize operating expenses by improving efficiency of equipment. Efficiency of agricultural product application equipment has been improved by providing relatively larger self-propelled implements for product application onto agricultural fields. These large product application implements provide wide product coverage per pass, which reduces application time by allowing product to be applied to the agricultural fields in fewer passes. The large product application implements store large volumes of product to be applied to the fields. As the product is applied onto the agricultural fields, weight distribution characteristics of the product application implement(s) can change as the product is emptied from storage compartments.

SUMMARY OF THE INVENTION

The present invention is directed to self-propelled agricultural product application implements such as high clearance sprayer and spreader implements that have sectioned product containers with controlled emptying of the sections to control weight distribution of the implements. This may improve handling performance of implements during a product application session that have weight distribution characteristics that vary over time because of application of large volumes of stored product onto agricultural fields, which can greatly lighten portions of the implements during use.

According to one aspect of the invention, a self-propelled agricultural product application implement is provided as a product container including multiple container sections that empty in a predetermined order to maintain ballast toward the front or back portion of the agricultural implement for a relatively longer period of time. A rearwardly disposed back container section may be emptied before emptying a forwardly disposed front container section. This may control weight distribution of the implement by maintaining relatively more weight toward the front of the implement as product is applied to the agricultural field, which may shift the weight distribution toward the front of the implement for enhancing traction of the front of the implement and thus also steering while climbing uphill sections of an agricultural field when compared to emptying product from a single container having a single product storing cavity.

According to another aspect of the invention, a self-propelled agricultural product application implement such as high clearance sprayer and/or spreader is provided that includes a chassis defining front and back ends and having a frame that supports a cab, an engine, and an applicator arrangement for delivering a liquid or dry product to an agricultural field. The applicator arrangement may include a sprayer boom for delivering liquid product or a rotary broadcaster for delivering dry product. The cab and engine may be supported at the front end of the chassis, with the engine extending in front of a pair of front wheels and the cab arranged behind the engine. A product container for storing the liquid or dry product is arranged at least partially between the front and back ends of the chassis. The product container may define a vented enclosure for storing a liquid product or an open box for storing a dry product. The product container includes multiple container sections storing respective portions of the liquid or dry product. At least one divider wall may extend transversely with respect to the implement such that the multiple container sections are separated from each other and longitudinally aligned with each other along a longitudinal axis of the implement. The container sections may be arranged within a single container body or may define separate and discrete enclosures arranged next to each other to define the overall container. An outlet system includes multiple variable outlet arrangements respectively arranged between the multiple container sections and the applicator arrangement. The outlet system is configured for sequentially emptying the multiple container sections. This is done by selectively permitting product to flow from the one of the multiple container sections, past a respective one of the multiple variable outlet arrangements, and out of the applicator arrangement. This allows relatively more weight to be maintained for a longer period of time during a product application session at portions of the implement that would otherwise be substantially lightened as product is applied to the agricultural field.

According to another aspect of the invention, the multiple container sections define front and back sections arranged relatively closer to the front and back ends of the implement, respectively. A divider wall may be arranged between the front and back sections of the product container. At least one intermediate section may be between the front and back sections and a divider wall may be arranged between each adjacent pair of the front, intermediate, and back sections.

According to another aspect of the invention, the variable outlet arrangement includes an output valve movable between open and closed positions for respectively permitting or preventing delivery of liquid product. This may include a needle driven by an actuator within a bore of a tube connecting the product container to a sprayer boom. The variable outlet arrangement may include an output gate movable between open and closed positions for respectively permitting or preventing delivery of dry product. This may include a plate driven by an actuator within a bore of a tube connecting the product container to a rotary broadcaster.

According to another aspect of the invention, a method is provided for controlling weight distribution in a self-propelled agricultural implement for delivering liquid or dry product to an agricultural field. The method includes storing product on a self-propelled agricultural implement for delivery onto an agricultural field. The product is stored in a product container having a front section arranged relatively closer to a front end of the implement and a back section arranged relatively closer to a back end of the implement. A target front-to-back weight distribution of the implement is determined. The target front-to-back weight distribution may be defined as a 50/50 front-to-back weight distribution of the implement. The target front-to-back weight distribution may be defined as a 50/50 front-to-back weight distribution of the implement when the product container is full, when the product container is half-empty, or when the product container is completely empty. The front and back sections of the product container are emptied at different times by delivering the product stored in the respective one of the front and back sections of the product container based at least in part on the determined target front-to-back weight distribution of the implement. This may allow for maintaining ballast at certain locations within the implement for a relatively long period of time during a product application session. This may provide ballast at the front and/or back end(s) of the implement by selectively maintaining stored product in one(s) of the container sections while the product from the other sections are emptied.

According to another aspect of the invention, one of the front and back ends of the implement defines a light end and the other one defines a heavy end. The emptying of the front and back sections of the product container at different times defines an empty sequence having product maintained closest to the light end while first emptying product from the container section that is closest to the heavy end.

According to another aspect of the invention, an initial product delivery phase is defined that includes emptying the container section that is arranged closest to the heavy end of the implement. During a subsequent product delivery phase, the container section that is arranged closest to the light end of the implement is emptied. Doing this may define a final product delivery phase which may follow one or more intermediate delivery phases, depending on the number of container sections within the product container.

According to another aspect of the invention, a method is provided for controlling weight distribution in a self-propelled agricultural implement with interchangeable liquid and dry product containers for delivering liquid or dry product to an agricultural field. The method includes storing liquid product in a liquid product container removably mounted on a self-propelled agricultural implement for delivery of the liquid product onto an agricultural field during a liquid product application session. The liquid product container has a front section arranged relatively closer to a front end of the implement and a back section arranged relatively closer to a back end of the implement. A dry product is stored in a dry product container removably mounted on the self-propelled agricultural implement for delivery of the dry product onto an agricultural field during a dry product application session. The dry product container has a front section arranged relatively closer to the front end of the implement and a back section arranged relatively closer to the back end of the implement. Target front-to-back weight distributions of the implement for the liquid and dry product application sessions are determined.

The front and back sections of the liquid product container are sequentially emptied by delivering product from one of the front and back sections of the liquid product container before delivering product from the other one(s) of the front and back sections of the liquid product container based at least in part on the determined target front-to-back weight distribution of the implement for the liquid product application session. This attenuates differences between an actual front-to-back weight distribution of the implement during the liquid product application session and the target front-to-back weight distribution of the implement during the liquid product application session.

The front and back sections of the dry product container are sequentially emptied by delivering product from one of the front and back sections of the dry product container before delivering product from the other one(s) of the front and back sections of the dry product container based at least in part on the determined target front-to-back weight distribution of the implement for the dry product application session. This attenuates differences between an actual front-to-back weight distribution of the implement during the dry product application session and the target front-to-back weight distribution of the implement during the dry product application session.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
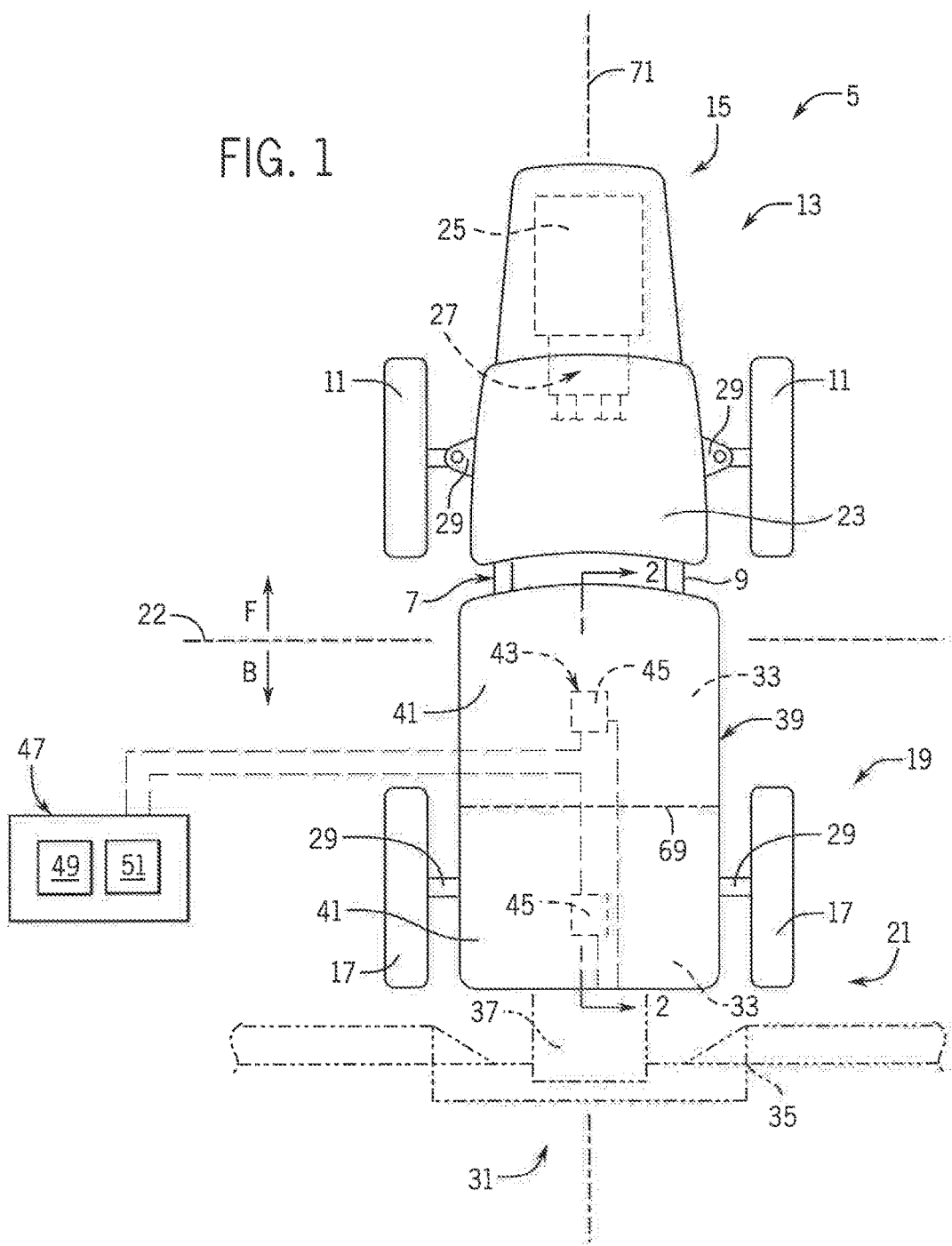
FIG. 1 is a simplified top plan view of a self-propelled agricultural product application implement.

Referring now to the drawings and specifically to FIG. 1, a self-propelled agricultural product application implement such as high clearance sprayer and/or spreader is shown as implement 5. Implement 5 may be of the high clearance sprayer and/or spreader type available from Case IH such as those of the Patriot® or SPX™ series. As shown schematically, implement 5 includes a chassis 7 having a frame 9 supporting a pair of front wheels 11 at a front portion 13 that defines a front end 15 of the implement 5. A pair of back wheels 17 is supported at a back portion 19 that defines a back end 21 of the implement 5. A front-to-back weight distribution of the implement 5 is schematically represented by a dashed line 22 and arrows labeled F and B on opposing sides of the dashed line 22. The dashed line 22 generally represents a divider between the front and back portions 13, 19 of the implement 5 and/or its chassis 7. Arrows F and B represent weight segments or how much weight of the implement 5 is distributed at the front and rear portions, 13, 19 of the implement 5, respectively. The front-to-back weight distribution of the implement 5 corresponds to how much of the weight of implement 5 is carried by and applied to the ground through the front and back wheels 11, 17.

Still referring to FIG. 1, a cab 23 is supported by the chassis 7, generally aligned with the front wheels 11 and arranged behind an engine 25 that extends in front of the front wheels 11. The engine 25 delivers power to a hydraulic system 27 that is configured for hydrostatically driving the wheels 11, 17 as controlled by an operator within the cab 23. The operator controls the hydraulic system 27 to vary delivery of hydraulic fluid to hydraulic wheel motors connected to planetary gearsets that rotate the wheels 11, 17 and are suspended below ends of supporting axles 29 to provide high clearance to the implement 5 by way of an open space between axes of rotation of the wheels 11, 17. The hydraulic system 27 may be configured for delivering power to diagonally aligned pairs of the wheels 11, 17 accordingly to an X-patterned delivery configuration. An applicator arrangement 31 for delivering a liquid or dry product 33 onto an agricultural field is supported at the back end 21 of the implement 5. Product 33 may be fertilizer, herbicide, pesticide, and/or other agricultural product(s) in liquid or dry form. When the product 33 is a liquid product, the applicator arrangement 31 includes a sprayer boom 35 for spraying the liquid product 33 onto the field. When the product 33 is a dry product, the applicator arrangement 31 includes a rotary broadcaster 37 for broadcast throwing the dry product 33 onto the field.

Still referring to FIG. 1, a product container 39 for storing the liquid or dry product 33 is arranged at least partially between the front and back ends 15, 21 of the implement 5. The product container 39 may define a vented enclosure for storing product 33, as a liquid product or an open box for storing product 33 as a dry product, explained in greater detail elsewhere herein. The product container 39 includes multiple container sections 41 storing liquid or dry product 33 such that the container sections 41 store respective portions of the total volume of product 33.

Still referring to FIG. 1, an outlet system 43 includes multiple variable outlet arrangements 45 respectively arranged between the multiple container sections 41 and the applicator arrangement 31. The outlet system 43 is configured for controlling emptying characteristics, for example, sequentially emptying the container sections 41. This is done by the outlet system 43 selectively permitting product 33 to flow from one of the container sections 41, past a respective one of the multiple variable outlet arrangements 45, and out of the applicator arrangement 31. In this way, the product container 39 and the outlet system 43 can be used to control weight distribution of the implement 5 by allowing relatively more weight to be maintained for a relatively longer period of time during a product application session at various portions of the implement 5. The outlet system 43 is operably connected to a control system 47 that includes a controller 49 and power supply 51, as is known, for controlling the outlet system 43 by actuating of the variable outlet arrangements 45 to the product flow rate through each of the variable outlet arrangements 45. The controller 49 can include an industrial computer or, e.g., a programmable logic controller (PLC), along with corresponding software and suitable memory for storing such software and hardware including interconnecting conductors for power and signal transmission for controlling electronic, electro-mechanical, and hydraulic components of the outlet system 43.

Figure 2:
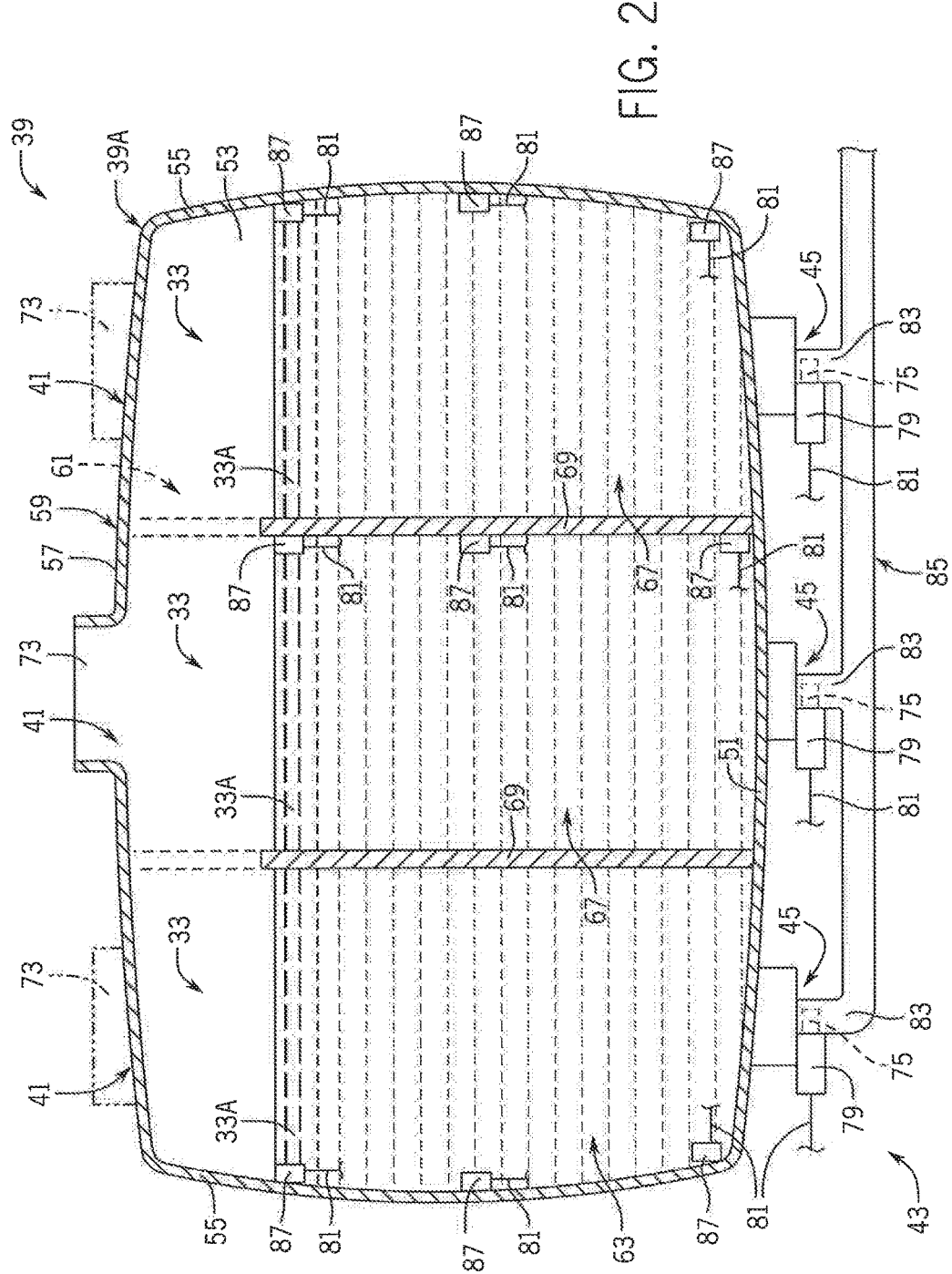
FIG. 2 is a simplified cross-sectional view of a product container of the of a self-propelled agricultural product application implement of FIG. 1.

Referring now to FIG. 2, the product 33 is shown as a liquid product 33A and the product container 39 is shown as a liquid product container 39A removably mounted to the chassis 7 (FIG. 1) for delivering the liquid product 33A. Liquid product container 39A has a bottom wall 51 interconnected to side and end walls 53, 55 and a top wall 57 that collectively define an enclosure 59 surrounding an inside space 61. The container sections 41 define a front section 63 arranged relatively closer to the front end 15 of the implement 5 (FIG. 1) and a back section 65 arranged relatively closer to the back end 21 of the implement 5 (FIG. 1). An intermediate section 67 is arranged between the front and back sections 63, 65. Divider walls 69 separate the container sections 41 from each other, such as adjacent pairs of the front, back, and intermediate sections 63, 65, 67.

Referring again to FIG. 1, the divider wall(s) 69 extends transversely across an entire width of the liquid product container 39A and thus transversely with respect to the implement 5. With the divider walks) 69 extending transversely with respect to the implement 5, the container sections 41 are separated from each other by divider wall(s) 69 and are longitudinally aligned with each other along a longitudinal axis 71 of the implement.

Referring again to FIG. 2, in this embodiment, the divider walls 69 extend vertically along more than ½, for example, more than ⅔ of the height of the liquid product container 39A. This configuration allows for filling all of the front, back, and intermediate sections 63, 65, 67 with a single fill port 73 that extends through the top wall 57, by permitting the liquid product 33A to spill over the tops of the divider walls 69 for filling all of the front, back, and intermediate sections 63, 65, 67. In another embodiment, the divider walls 69 extend the full height of the liquid product container 39A, represented by the dashed line extensions of divider wall 69. In this configuration, each of the front, back, and intermediate sections 63, 65, 67 has a corresponding port 73, two of which are shown in dashed line form in FIG. 2. It is understood that the port(s) 73 may be arranged toward the bottom of the product container 39 for embodiments in which the product container 39 is bottom-loaded or bottom-filled.

Still referring to FIG. 2, the outlet system 43 may empty the container sections 41 according to an emptying strategy, such as in a sequence to empty the container sections 41 at different times, by controlling the variable outlet arrangements 45. Each variable output arrangement 45 may include a valve 75 that is movable between the open and closed positions by way of an actuator 79 connected to the control system 47 with conductors 81. Moving the valve 75 between the open and closed positions correspondingly unblocks or blocks a flow path through a discharge tube 83. The discharge tube 83 connects to a product delivery tube 85 that is operably connected to the applicator arrangement 31 (FIG. 1) for delivering the liquid product 33A onto the agricultural field. Sensors 87 are mounted in each of the container sections 41 and are connected with conductors 81 to the control system 47 for determining the level of liquid product 33A within each of the container sections 41 for evaluating when to empty the various container sections 41. The signal(s) from the sensors 87 allow the control system 47 to control the outlet system 43 for emptying the container sections 41 at different times. This may include a sensor(s) 87 sending a signal indicating that a container section 41 is empty or nearly empty, which may include detecting whether there is or is not product within the container section(s) 41 at a particular height at which the sensor(s) 87 is mounted, whereby the control system 47 commands the system 43 to empty another container section 41 or start a timer for counting down to start emptying another container section 41. In one embodiment, signals from the sensor(s) 87 are used by the control system 47 to indicate a fill-level status of a container section(s) 41 through a display or otherwise to an operator to allow the operator to manually command emptying of another container section, 41. In one embodiment, at least some of the sensors 87 of the product container 39, optionally sensors mounted toward front and rear portions 13, 19 of the implement 5, are weight detecting. This allows the control system 47 to determine weights on the front and rear portions 13, 19 of the implement 5 based on signals from such sensors and correspondingly control front-to-back weight distribution of the implement 5 by selectively unloading the container sections 41 at different times and/or rates. In another embodiment, sight gauges are incorporated into the product container 39 for determining fill levels of the container sections 41 instead of or in addition to sensors 87.

Figure 3:
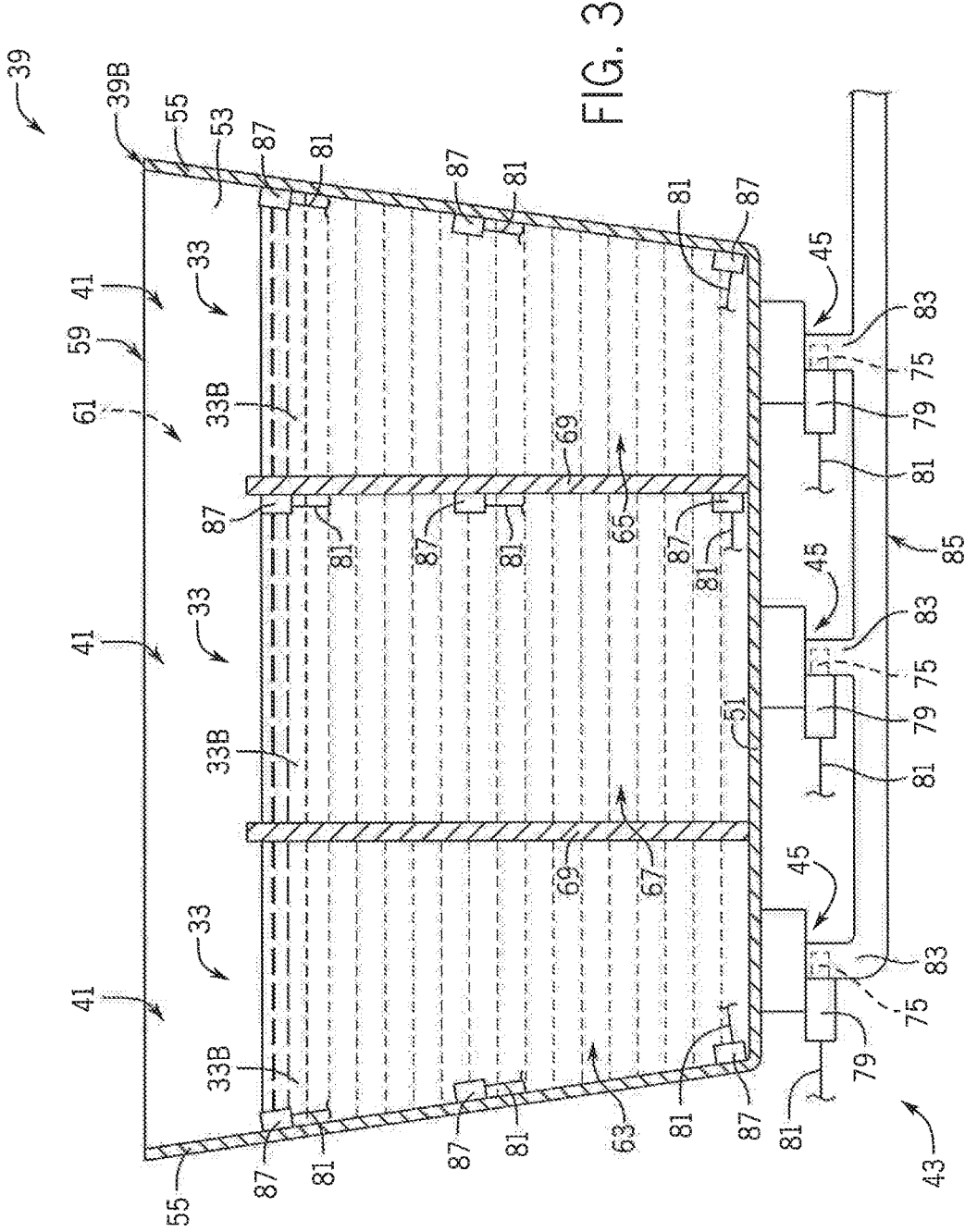
FIG. 3 is a simplified cross-sectional view of a variant the product container of FIG. 2.

Referring now to FIG. 3, product container 39 is mostly identical to that of FIG. 2, whereby such descriptions are applicable here with respect to the product container 39 of FIG. 3. The product container 39 of FIG. 3 differs from that of FIG. 2 in the following ways. The product 33 is shown as a dry product 33B and the product container 39 is shown as a dry product container 39B removably mounted to the chassis 7 (FIG. 1) for delivering the dry product 33B. It is noted that the liquid and dry product containers 39A, 39B may be interchangeably mounted to the chassis 7 (FIG. 1) to allow implement 5 to apply both liquid and dry product 33A, 33B to the agricultural field. The dry product container 39B defines an enclosure 59 that maintains the dry product 33B within the space 61, but has an open top wall in dry box-type configuration, unlike the totally enclosed liquid product container 39A. Within the variable outlet arrangements 45, the valve 75 of the dry product container 39B may define a gate-type valve 75 whereas the valve 75 of the liquid product container 39A may define a ball-type or pin-type valve 75.

Figure 4:
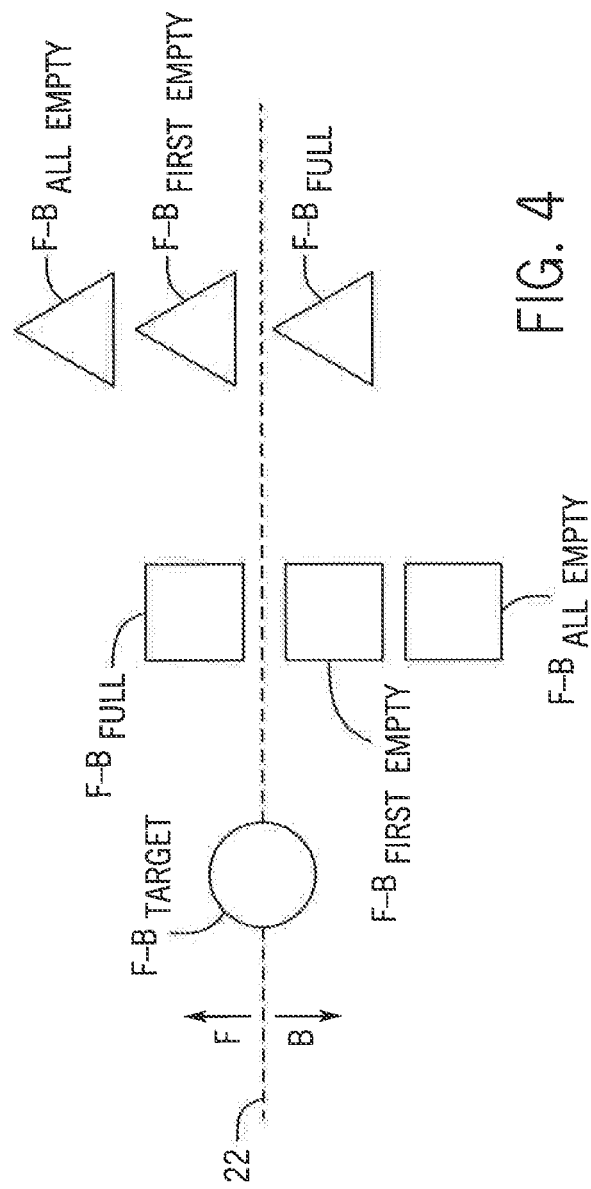
FIG. 4 is a schematic representation of emptying strategies.

Referring now to FIGS. 2 and 3, the outlet system 43 controls the emptying characteristics of the liquid or dry product containers 39A, 39B by emptying the container sections 41 at different times according to an emptying strategy, based at least in part on a target front-to-back weight distribution of the implement 5. The emptying strategy allows the container sections 41 to be emptied at different times to attenuate differences between a target front-to-back weight distribution and an actual front-to-back weight distribution. This allows the actual front-to-back weight distribution to approximate the target front-to-back weight distribution for a relatively long period of time during a product application session. Referring now to FIG. 4, the target front-to-back weight distribution may be a predetermined value that provides desired traction characteristics for the implement 5. In one embodiment, the target front-to-back weight distribution is 50/50, front-to-back, whereby a center of gravity of the implement 5 as viewed from above would be defined at a halfway point between front and back wheels 11, 17 at the front-to-back split of the weight distribution. This allows the front and back wheels 11, 17 to apply substantially equal pressure to the ground, which may reduce wheel slipping at under-weighted wheels and may prevent wheel sinking at over-weighted wheels.

Still referring to FIG. 4, the target front-to-back weight distribution is schematically represented by a circle labeled $F\text{-}B_{Target}$, generally aligned with the dashed line 22 dividing the front and back weight segments F and B of the implement 5 at a longitudinal midpoint between the front and back wheels 11, 17. The columns of squares and triangles represent actual front-to-back weight distributions at different times during a product application session according to different emptying strategies. The container sections 41 may be arranged and controlled by the outlet system 43 according to the emptying strategy so that during the product application session, the actual front-to-back weight distribution starts with relatively more weight toward the light end of the implement 5. While emptying the container sections 41, the actual front-to-back weight distribution may eventually transition past the target front-to-back weight distribution, for example, when all of the container sections 41 are empty, but in a manner that allows the actual front-to-back weight distribution value to remain close to the target front-to-back weight distribution value, such as within about plus or minus 10-percent or plus or minus 5-percent.

Referring now to FIGS. 1 and 4, the squares shown in FIG. 4 represent a top plan view of movement of the center of gravity and location of the front-to-back split of the weight distribution according to exemplary emptying strategy for trying to maintain weight toward the front end 15 (FIG. 1) by initially emptying product from a container section(s) 41 arranged closer to the back end 21. In one embodiment, this emptying strategy is used when the implement 5 is lighter toward the front end 15 when the liquid or dry product container(s) 39A, 39B is empty. The triangles shown in FIG. 4 represent a top plan view of movement of the center of gravity and location of the front-to-back split of the weight distribution according to exemplary emptying strategy for trying to maintain weight toward the back end 21 (FIG. 1) by initially emptying product from a container section(s) 41 arranged closer to the front end 15. In one embodiment, this emptying strategy is used when the implement 5 is lighter toward the back end 21 when the liquid or dry product container(s) 39A, 39B is empty.

Referring again to FIG. 4, a square labeled $F\text{-}B_{Full}$ represents a location of the center of gravity of the implement 5 as viewed from above and therefore the location of the front-to-back split of the weight distribution when the liquid or dry product container(s) 39A, 39B (FIGS. 2 and 3) is full. This may be at a beginning of the product application session. A square labeled $F\text{-}B_{First\ Empty}$ represents a location of the center of gravity of the implement 5 as viewed from above and therefore the location of the front-to-back split of the weight distribution when the first container section 41 has been emptied. This may correspond to when the back section 65 of the liquid or dry product container(s) 39A, 39B has been emptied during an initial product delivery phase of the product application session. A square labeled $F\text{-}B_{All\ Empty}$ represents a location of the center of gravity of the implement 5 as viewed from above and therefore the location of the front-to-back split of the weight distribution when the all container sections 41 has been emptied. This may correspond to when the intermediate and/or front container sections 67, 63 of the liquid or dry product container(s) 39A, 39B has been emptied during a subsequent product delivery phase(s) of the product application session.

Referring again to FIG. 4, a triangle labeled $F\text{-}B_{Full}$ represents a location of the center of gravity of the implement 5 as viewed from above and therefore the location of the front-to-back split of the weight distribution when the liquid or dry product container(s) 39A, 39B (FIGS. 2 and 3) is full. This may be at a beginning of the product application session. A triangle labeled F-B First Empty represents a location of the center of gravity of the implement 5 as viewed from above and therefore the location of the front-to-back split of the weight distribution when the first container section 41 has been emptied. This may correspond to when the back section 65 of the liquid or dry product container(s) 39A, 39B has been emptied during an initial product delivery phase of the product application session. A triangle labeled $F\text{-}B_{All\ Empty}$ represents a location of the center of gravity of the implement 5 as viewed from above and therefore the location of the front-to-back split of the weight distribution when the all container sections 41 have been emptied. This may correspond to when the intermediate and/or front container sections 67, 63 of the liquid or dry product container(s) 39A, 39B have been emptied during a subsequent product delivery phase(s) of the product application session.

Figure 5:
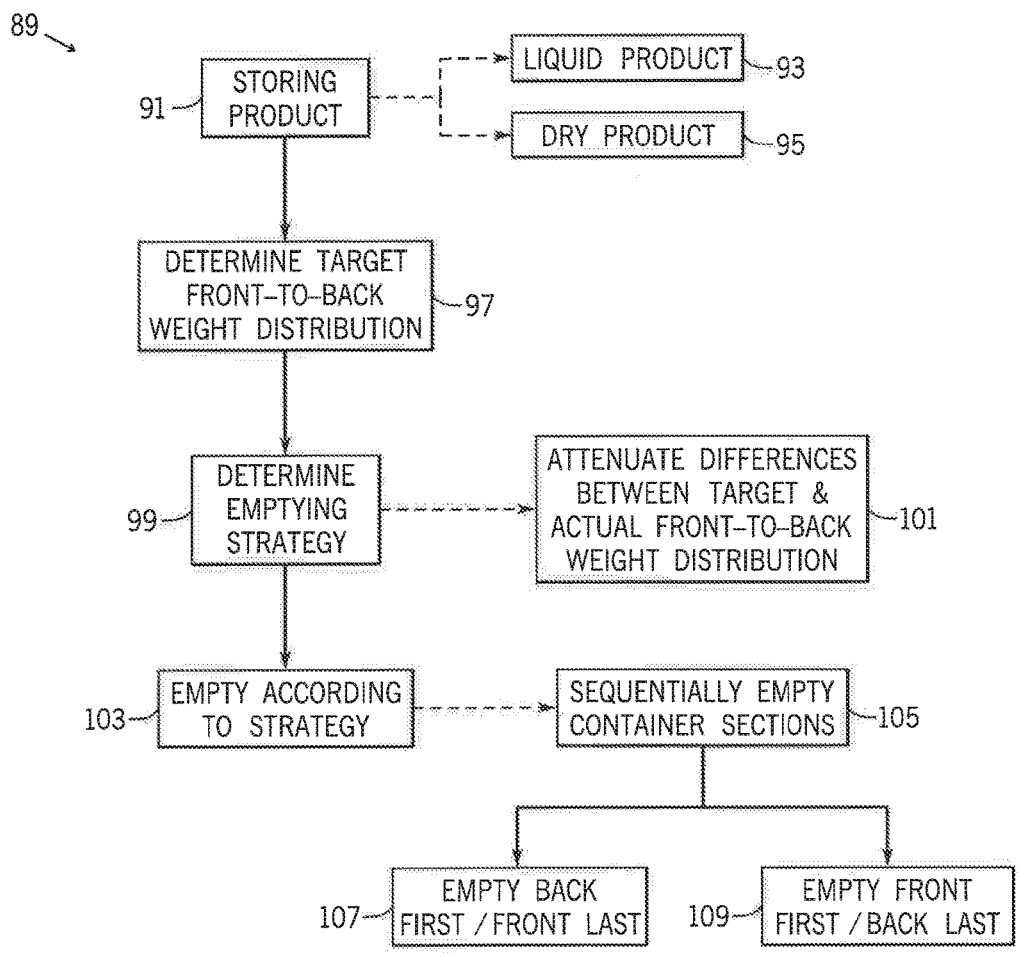
FIG. 5 is a flowchart of a procedure for controlling weight distribution of a self-propelled agricultural product application implement by way of sectioned product containers.

Referring now to FIG. 5 and with further reference to FIGS. 2 and 3, an exemplary method for controlling weight distribution in a self-propelled agricultural implement 5 is shown as represented by numeral 89. As represented by block 91, product 33 is stored in multiple container sections 41 of a product container 39 on the self-propelled agricultural implement 5 for delivery onto an agricultural field. As represented by blocks 93, 95, respectively, the product 33 is a liquid product 33A stored in a liquid product container 39A or a dry product 33B stored in a dry product container 39B. As represented at block 97, a target front-to-back weight distribution of the implement is determined. This may be done for a liquid product delivery session and a dry product delivery session. As represented at block 99, an emptying strategy is determined for emptying the container sections 41. As represented at block 101, the strategy may be configured to attenuate differences between the target front-to-back weight distribution and an actual front-to-back weight distribution over time. This may be done for the liquid product delivery session and the dry product delivery session. As represented at block 103, the product container 39 is emptied according to the emptying strategy by emptying the container sections 41 at different times, for example, sequentially as represented by block 105. As represented at blocks 107 and 109, respectively, the container sections 41 emptied starting with the container section 41 closest to the back end 21 end of the implement and moving toward the front end 15 of the implement 5 or by starting with the container section 41 closest to the front end 15 end of the implement and moving toward the back end 21 of the implement 5.

Many changes and modifications could be made to the invention without departing from the spirit thereof. The scope of these changes will become apparent from the appended claims.

We claim:

1. A self-propelled agricultural product application implement for delivering liquid or dry product to an agricultural field, the implement comprising:
   a chassis defining front and back ends and supporting a cab, an engine, and an applicator arrangement for delivering a liquid or dry product to an agricultural field;
   a product container for storing the liquid or dry product and arranged at least partially between the front and back ends of the chassis, the product container including multiple container sections storing respective portions of the liquid or dry product and separated from each other by at least one divider wall extending transversely with respect to the implement such that the multiple container sections are longitudinally aligned with each other along a longitudinal axis of the implement;
   an outlet system including multiple variable outlet arrangements respectively arranged between the multiple container sections and the applicator arrangement, the outlet system configured to selectively permit product to flow from one of the multiple container sections, past a respective one of the multiple variable outlet arrangements, and out of the applicator arrangement;
   a control system operatively connected to the product container and to the outlet system, the control system configured to:
      monitor weights of each of the multiple container sections;
      determine an actual front-to-back weight distribution of the implement;
      determine an emptying strategy for emptying the multiple containers at different times such that the actual front-to-back weight distribution of the implement approximates a target front-to-back weight distribution of the implement that provides a desired traction characteristic for the implement; and
      command the outlet system to selectively permit product to flow from a selected one of the multiple container sections in accordance with the emptying strategy.

2. The implement of claim 1, wherein the multiple container sections include a front section and a back section, and wherein a divider wall is arranged between the front and back sections of the product container.

3. The implement of claim 2, wherein the product container includes at least one intermediate section arranged between the front and back sections and wherein a divider wall is arranged between each adjacent pair of the front, intermediate, and back sections of the product container.

4. The implement of claim 2, wherein the product container includes at least one intermediate section arranged between the front and back sections and wherein a divider wall is arranged between each adjacent pair of the front, intermediate, and back sections of the product container.

* * * * *